(12) United States Patent
Jensen et al.

(10) Patent No.: US 12,018,648 B2
(45) Date of Patent: *Jun. 25, 2024

(54) TRANSPORT ASSEMBLY

(71) Applicant: SIEMENS GAMESA RENEWABLE ENERGY A/S, Brande (DK)

(72) Inventors: Jens Hald Jensen, Give (DK); Jesper Bjerre Pedersen, Torring (DK); Jeppe Soee, Ronde (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 198 days.

This patent is subject to a terminal disclaimer.

(21) Appl. No.: 17/558,635

(22) Filed: Dec. 22, 2021

(65) Prior Publication Data

US 2022/0112882 A1 Apr. 14, 2022

Related U.S. Application Data

(63) Continuation of application No. 16/347,878, filed as application No. PCT/EP2017/076684 on Oct. 19, 2017, now Pat. No. 11,506,179.

(30) Foreign Application Priority Data

Nov. 11, 2016 (DE) ...................... 10 2016 222.212.0

(51) Int. Cl.
*B60P 3/00* (2006.01)
*F03D 13/40* (2016.01)

(52) U.S. Cl.
CPC ................ *F03D 13/40* (2016.05); *B60P 3/00* (2013.01); *F05B 2260/02* (2013.01)

(58) Field of Classification Search
CPC ...... B60P 3/40; B60P 3/00; B60P 7/12; F03D 13/40; F05B 2260/02
(Continued)

(56) References Cited

U.S. PATENT DOCUMENTS 1,780,277 A 11/1930 Seeley et al.
5,344,266 A 9/1994 Kolb
(Continued)

FOREIGN PATENT DOCUMENTS

CN 1771151 A 5/2006
CN 102085938 A 6/2011
(Continued)

OTHER PUBLICATIONS

PCT International Search Report dated Oct. 19, 2017 for Application No. PCT/EP2017/076684.
(Continued)

*Primary Examiner* — Stephen T Gordon
(74) *Attorney, Agent, or Firm* — Schmeiser, Olsen & Watts, LLP

(57) ABSTRACT

Provided is a transport assembly for use in the transport of a large heavy load, including a frame unit realized to lie on a load platform of a transport vehicle; a number of first load-positioning beams, wherein a first load-positioning beam is realized to span a single frame unit; and/or a number of second load-positioning beams, wherein a second load-positioning beam is realized to span a pair of adjacent frame units; and a part adapter realized to engage with a load-positioning beam and to engage with the load. The embodiments further describe a method of securing a large heavy load on a load platform during a transport maneuver.

13 Claims, 6 Drawing Sheets

(58) Field of Classification Search
USPC .............................................. 410/44, 45, 46
See application file for complete search history.

(56) References Cited

U.S. PATENT DOCUMENTS

| | | | |
|---|---|---|---|
| 5,954,465 | A | 9/1999 | Ellerbush |
| 6,334,746 | B1 | 1/2002 | Nguyen |
| 8,967,929 | B2 * | 3/2015 | Frederiksen ............. B60P 3/40 410/44 |
| 11,506,179 | B2 * | 11/2022 | Jensen ...................... B60P 3/00 |
| 2011/0132239 | A1 | 6/2011 | Poulsen et al. |
| 2011/0255934 | A1 | 10/2011 | Delgado Matarranz |
| 2011/0304122 | A1 | 12/2011 | Poulsen |
| 2012/0171007 | A1 | 7/2012 | Poulsen |
| 2014/0017047 | A1 | 1/2014 | Bitsch et al. |
| 2014/0072382 | A1 * | 3/2014 | Jespersen ................ F03D 13/40 410/44 |
| 2015/0003954 | A1 | 1/2015 | Koerner et al. |
| 2016/0052606 | A1 | 2/2016 | Dekker et al. |
| 2016/0069099 | A1 | 3/2016 | Ohlen et al. |

FOREIGN PATENT DOCUMENTS

| | | |
|---|---|---|
| CN | 102628429 A | 8/2012 |
| CN | 103299071 A | 9/2013 |
| CN | 105020228 A | 11/2015 |
| CN | 105189242 A | 12/2015 |
| CN | 205207043 U | 5/2016 |
| CN | 205207053 U | 5/2016 |
| DE | 102012002755 A1 | 8/2013 |
| EP | 2395240 A1 | 12/2011 |
| WO | WO 2011009538 A2 | 1/2011 |

OTHER PUBLICATIONS

Non-Final Office Action dated May 11, 2021 for U.S. Appl. No. 16/347,878.
Notice of Allowance (dated Jul. 27, 2022) for U.S. Appl. No. 16/347,878, filed May 7, 2019.
Advisory Action (dated Jun. 29, 2022) for U.S. Appl. No. 16/347,878, filed May 7, 2019.
Final Office Action (dated Apr. 12, 2022) for U.S. Appl. No. 16/347,878, filed May 7, 2019.

* cited by examiner

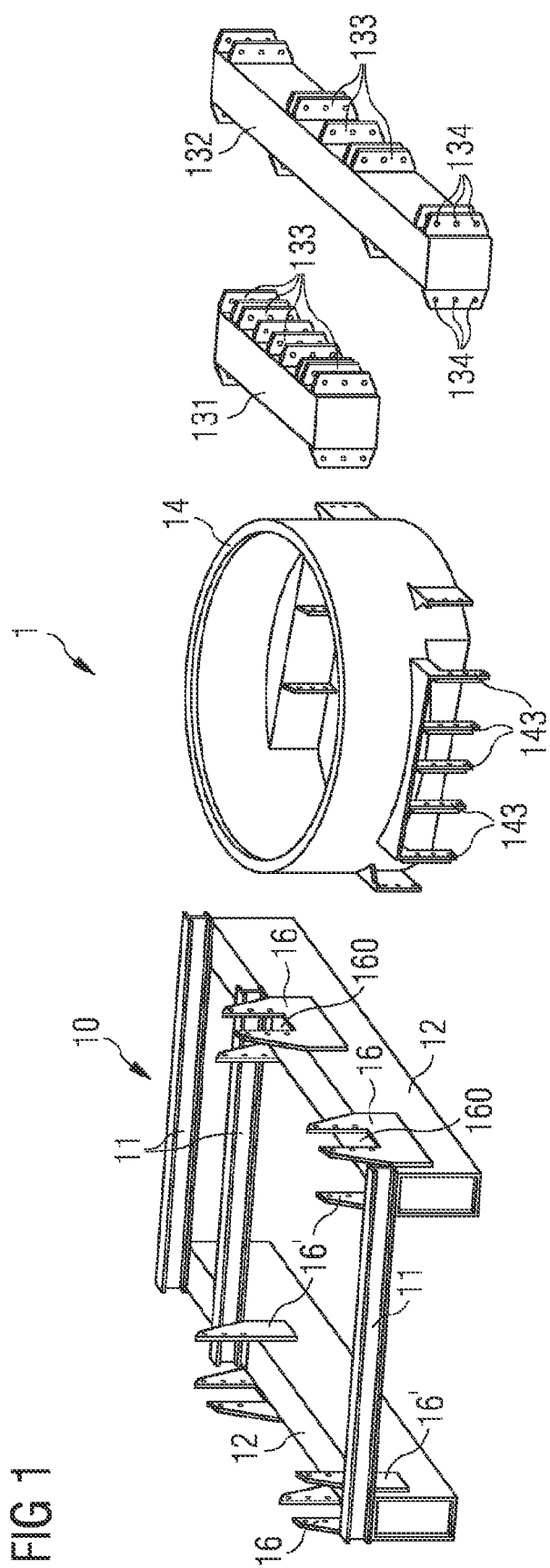

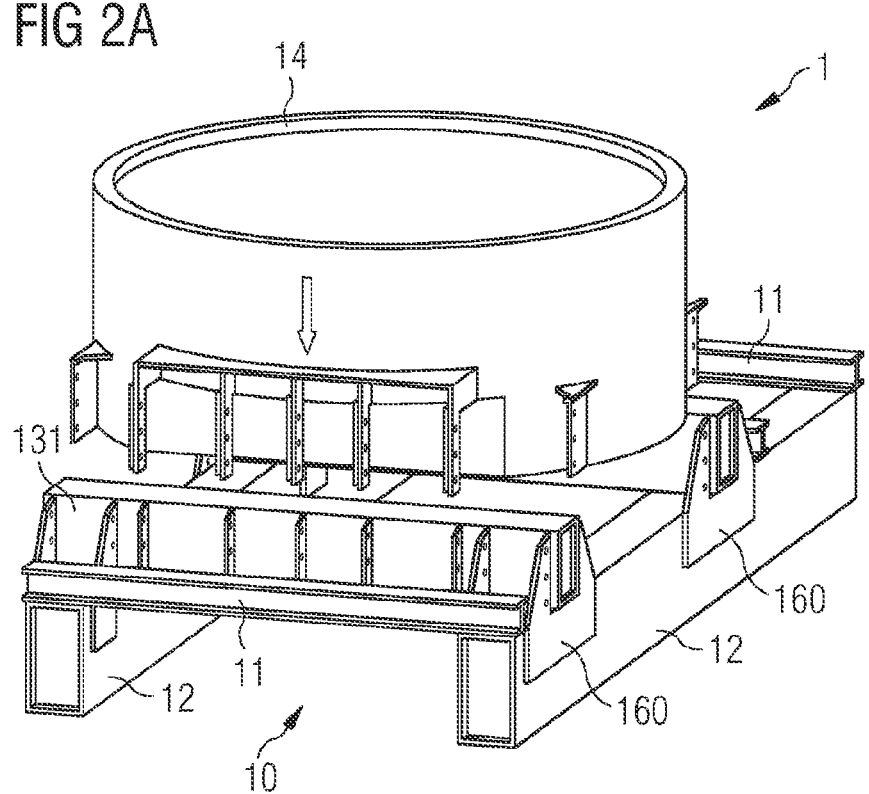
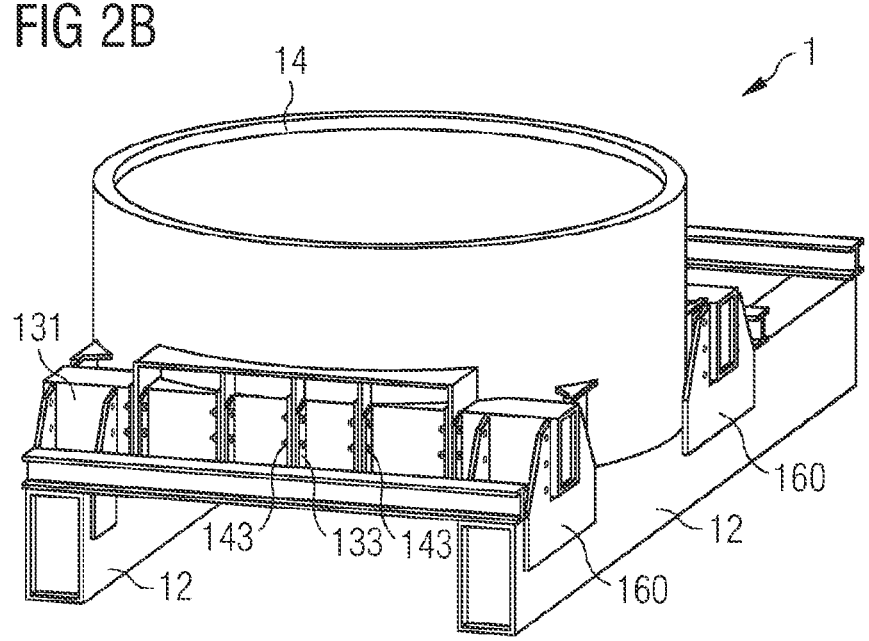

TRANSPORT ASSEMBLY

CROSS-REFERENCE TO RELATED APPLICATIONS

This application is a continuation application of U.S. application Ser. No. 16/347,878, filed May 7, 2019, and entitled "TRANSPORT ASSEMBLY", which claims priority to PCT Application No. PCT/EP2017/076684, having a filing date of Oct. 19, 2017, which is based on German Application No. 10 2016 222 212.0, having a filing date of Nov. 11, 2016, the entire contents all of which are hereby incorporated by reference.

FIELD OF TECHNOLOGY

The following relates to a transport assembly for securing a large heavy load to a load platform during a transport maneuver. The following further describes a method of securing a large heavy load on a load platform during a transport maneuver.

BACKGROUND

During the manufacture of a large structure such as a wind turbine it is often necessary to transfer one or more components from one location to another. The installation of a large machine such as a wind turbine also often requires the transfer of one or more components between locations.

Such load transfer maneuvers can become expensive when it is necessary to move loads that have irregular shapes in addition to being very heavy. For example, the different parts of a wind turbine can have different shapes and different weights. A nacelle unit of a large 10-20 MW generator can weigh in the region of several hundred metric tons, for example. Its transport is made difficult owing to its irregular shape and to the lack of external features which could be used to hold it during transport. Transport of such an irregular heavy object can be made even more difficult if its center of gravity is offset from its geometrical center. It is necessary to ensure that the load and the transport equipment are not damaged during a transport maneuver. However, an irregularly shaped object may exert bending moments on the loading platform and may damage the transport equipment. A poorly or inadequately supported load may itself be damaged during transport by such bending moments.

A further problem arises when it is necessary to handle several different versions of a product, for example to transport different versions of a wind turbine component and when each version of a component has a different weight and different dimensions.

For these reasons, it is generally necessary to design and construct purpose-built and specially designed transport equipment for each different type of load. However, purpose-built or custom equipment has limited re-usability and adds significantly to the overall manufacturing or installation costs.

SUMMARY

An aspect relates to a more economical way of transporting large irregular loads.

According to embodiments of the invention, the transport assembly is intended for use in the transport of a large heavy load, and comprises a frame unit realized to fit over a load platform of a transport vehicle; one or more first load-positioning beams, each realized to span a single frame unit and/or one or more second load-positioning beams, each realized to span a pair of adjacent frame units; and at least one part adapter realized to engage with a load-positioning beam and to engage with the load.

An advantage of the transport assembly according to embodiments of the invention is that it allows a very heavy load to be securely held in place on a load platform of a transport vehicle in such a way that the load is evenly distributed over the load platform. Furthermore, the modular nature of the transport assembly allows various different kinds of load—with different dimensions and different weights—to be transported using the same transport assembly. In other words, assembly configuration of the inventive transport assembly can easily be adjusted for the transport of one kind of load, and then later adjusted again for the transport of a different load. Even for loads with irregular shapes, the transport assembly allows a balanced and even load distribution. The inventive transport assembly effectively prevents bending moments that would otherwise place stress on the transport equipment.

According to embodiments of the invention, the method of securing a large heavy load on a load platform during a transport maneuver comprises the steps of arranging a single frame unit of such a transport assembly over the load platform and then arranging at least one first load-positioning beam across the single frame unit; or arranging two frame units of such a transport assembly over a pair of adjacent load platforms, and arranging at least one second load-positioning beam across the frame units. In a subsequent step, a part adapter of the transport assembly is engaged with a load-positioning beam, and the load is engaged with the part adapter.

The inventive method is favorably quick and economical to carry out, since it is not necessary to provide dedicated load-carrying means for different kinds of load.

Particularly advantageous embodiments and features of embodiments of the invention are given by the dependent claims, as revealed in the following description. Features of different claim categories may be combined as appropriate to give further embodiments not described herein.

In the following, it may be assumed that the load to be transported is a wind turbine component such as a nacelle unit, a tower head unit, a generator unit, etc. Such parts are generally cumbersome and unwieldy, having great weight in addition to a complicated shape, particularly when the component is for use in a large wind turbine. Here, the term "large wind turbine" is to be understood to mean a wind turbine with a power output in the region of 10-20 MW as mentioned in the introduction. It may be assumed that the transport assembly is realized to transport a component such as a nacelle unit with a weight that might exceed 1000 metric tons.

The frame unit is shaped to fit essentially exactly over the loading platform that will be used in the transport maneuver. A loading platform may be understood to be a long flat carrier that can be moved by rollers or wheels. For example, a loading platform with a length of about 25 m and a width of about 3 m can be mounted onto an arrangement of multiple wheel axles. In preferred embodiments of the invention, the frame unit comprises a pair of parallel supporting beams or lateral beams arranged to lie on either longitudinal side of the load platform. The two lateral beams are connected together by means of a plurality of cross-connecting beams or transverse beams arranged at right angles to the lateral beams and welded or bolted to the lateral beams in order to fix their position. A transverse beam is arranged to rest on an upper surface of the load platform to ensure optimal load transfer onto the flatbed surface of the load platform. In preferred embodiments of the invention, the lateral beams extend along the sides of the load platform so that their upper faces essentially lie flush with the upper surface of the load platform, and so that the lower faces of the transverse beams rest on the upper surface of the load platform. This arrangement allows a favorably effective load transfer onto the load platform.

The inventive transport assembly can be used with a single load platform but can equally well be used with two or more load platforms. In preferred embodiments of the invention, therefore, the first load-positioning beam is realized to engage with a part adapter positioned centrally over a single frame unit on a single load platform, and the second load-positioning beam is realized to engage with a part adapter positioned centrally over a pair of adjacent frame units on two load platforms, etc. The first load-positioning beam may be referred to in the following as a "short" load-positioning beam, since it only spans one frame unit. The length of the short load-positioning beam need not be any longer than the width of the frame unit. The second load-positioning beam may be referred to in the following as a "long" load-positioning beam, since it spans two (or more) frame units. The length of the long load-positioning beam can comprise at least the combined width of two frame units, for example, to allow for a space between the adjacent load platforms.

A load-positioning beam is secured to the frame unit in some way so that the load can be safely held at all times during the transport maneuver. To this end, in preferred embodiments of the invention, the transport assembly comprises a number of holding elements or holders arranged to hold a load-positioning beam in place on the frame unit. In one preferred embodiment of the invention, a holding element or holder is arranged to extend upward from a lateral beam of the frame unit to engage from below with a load-positioning beam. Equally, a holding element or holder can be arranged to extend downward from a load-positioning beam to engage from above with a lateral beam. For example, a holding element or holder can comprise a rod or similar device extending downward from a load-positioning beam and into a corresponding hole in a lateral beam. A row of holes spaced at intervals in the upper side of each lateral beam can offer a number of possibilities in arranging the load-positioning beams. In a similar manner, a holding element or holder can comprise a rod extending upward from a lateral beam and into a corresponding hole on the under surface of a load-positioning beam. Here, a series of rods spaced at intervals along the upper side of each lateral beam can offer a number of possibilities in arranging the load-positioning beams. In further preferred embodiments of the invention, a holding element or holder is constructed as a plate comprising a rectangular cut-out to engage a beam. The plate can be bolted to a lateral beam, for example, and arranged so that the cut-out faces upwards, ready to receive a load-positioning beam. In this preferred embodiment, a matching arrangement of through-holes in a holding plate and in a complementary arrangement of fins mounted to a load-positioning beam can be provided for receiving fasteners to secure the load-positioning beam to the frame unit. Of course, these embodiments are exemplary, and other realizations are possible. In each case, it is preferable that the load-positioning beams rest on the load platform(s) so that the weight of the load can be transferred evenly to the load platform(s).

The part adapter is also secured to the frame unit in some way so that the load can be safely held at all times during the transport maneuver. In preferred embodiments of the invention, therefore, the transport assembly comprising an engaging structure arranged to form a connection between the part adapter and a load-positioning beam, wherein the engaging structure comprises an arrangement of bars mounted to the part adapter and a complementary arrangement of fins mounted to a load-positioning beam, which bars and fins comprise matching through-holes for receiving fasteners. For example, a load-positioning beam can be equipped with a number of vertical fins extending outward from the beam, and the part adapter can be equipped with one or more corresponding arrangements of vertical bars or fins. Once the part adapter has been put into place over the frame unit(s), it can be secured to the load-positioning beam(s) by fasteners inserted through the matching through-holes.

As mentioned above, the transport assembly is intended for use in the transport of large and heavy components such as the nacelle unit of a large wind turbine. In preferred embodiments of the invention, therefore, the part adapter is realized to engage with a circular tower head interface of a wind turbine. The part adapter is an essentially circular element with a diameter in the range of 4-7 m, and shaped to fit inside the tower head interface, or outside the tower head interface, depending on the manner in which the tower head interface of the nacelle unit has been constructed. For example, if the tower head interface has been constructed with an inner flange which will be bolted to a corresponding flange at the top of a wind turbine tower, the part adapter can be shaped to fit that flange. When the nacelle unit is lowered into place on the part adapter, the flange will rest on the upper surface of the part adapter. Of course, the part adapter can also be secured to the flange if necessary.

In the case of a large and unwieldy part such as a tower head unit or nacelle unit, it may be that the center of gravity of the load does not lie over the part adapter. Therefore, in preferred embodiments of the invention, the method comprises a preliminary step of determining an optimal position of at least one transverse beam relative to the lateral beams and the load-positioning beams of the frame unit. For example, a nacelle unit can be held in place by a part adapter mounted over two load-positioning beams arranged towards one end of the frame unit. The center of gravity of the nacelle unit may lie outside of the region defined by the load-positioning beams and the part adapter and may lie further behind this region. To counteract the bending moment that would otherwise act on the load platform, an additional transverse beam is placed further behind and secured to the lateral beams. The weight of the load can therefore be evenly distributed on the load platform through the load-positioning beams and the transverse beams.

BRIEF DESCRIPTION

Some of the embodiments will be described in detail, with references to the following Figures, wherein like designations denote like members, wherein:

FIG. 1 shows an exemplary embodiment of the inventive transport assembly

FIG. 2A shows a first embodiment of the inventive transport assembly during loading;

FIG. 2B shows a first embodiment of the inventive transport assembly after loading;

In the diagrams, like numbers refer to like objects throughout. Aspects in the diagrams are not necessarily drawn to scale.

DETAILED DESCRIPTION

Figure 3:
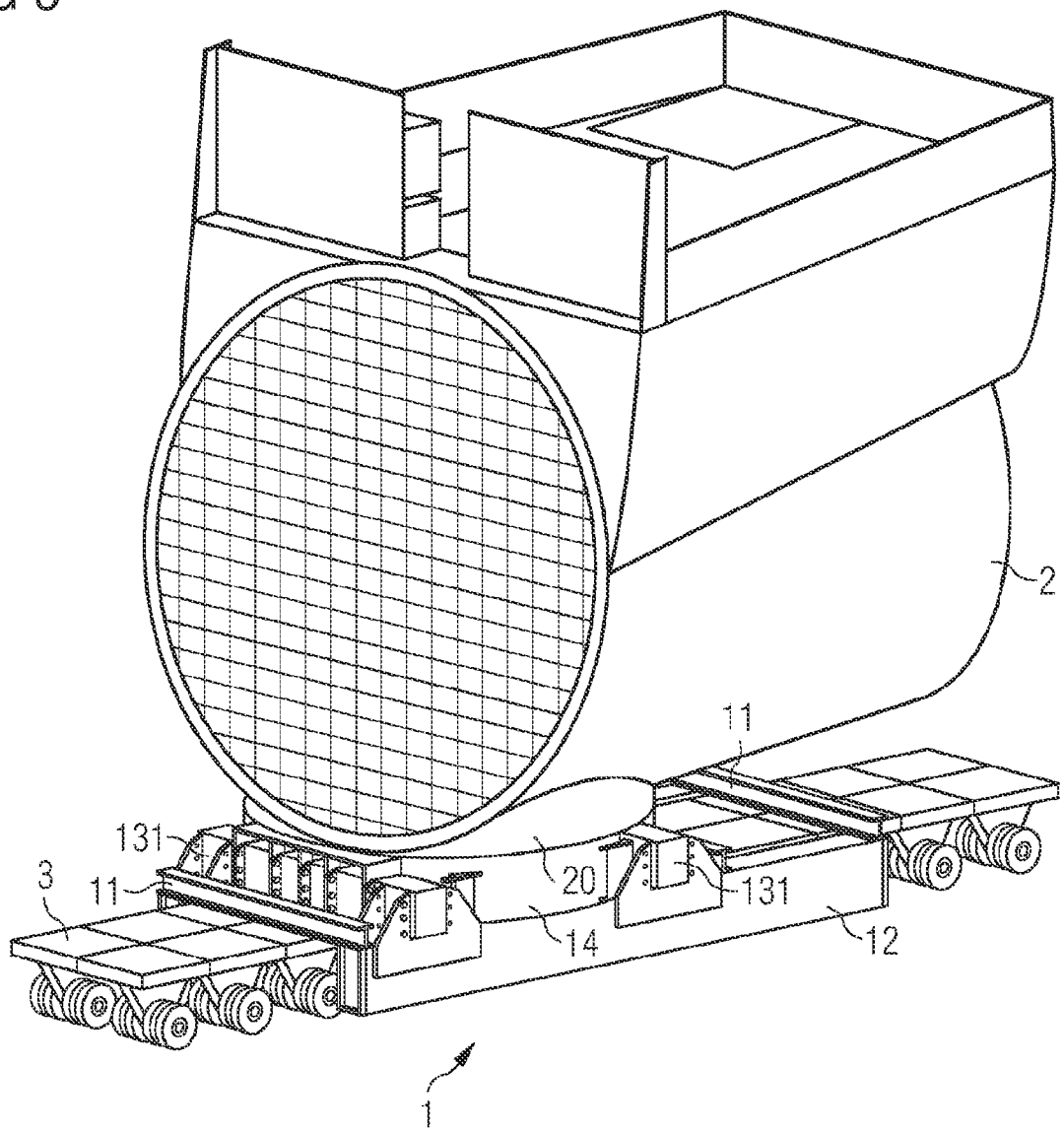
FIG. 3 shows the transport assembly of FIGS. 2A and 2B in use during the transport of a load.

FIG. 1 shows an exemplary embodiment of the inventive transport assembly 1, with a frame unit 10 constructed to rest on the load platform 3 of a transport vehicle (not shown), two different kinds of load-positioning beam 131, 132, and a part adapter 14.

The frame 10 essentially comprises a pair of parallel lateral beams 12 that will lie on either long side of the load platform 3, and several transverse or cross-connector beams 11 held in place by the lateral beams 12. A number of upright holding plates 16 are arranged on the inner and outer sides of each of the lateral beams 12. These holding plates 16 are shaped and arranged to accommodate a number of load-positioning beams 131, 132.

The diagram shows two load-positioning beams 131, 132 with different lengths. The short load-positioning beam 131 is for use with a single frame 10 arranged on a single load platform, while the long load-positioning beam 132 is for use with two frames 10 arranged side by side on two adjacent load platforms. Each load-positioning beam 131, 132 has a number of fins 133 extending along its vertical side faces. These fins 133 will be used to secure the load-positioning beam 131, 132 to the frame 10, and to secure a part adapter 14 to the load-positioning beam 131, 132, as will be explained below.

The part adapter 14 in this exemplary embodiment will be used to support a nacelle unit of a wind turbine during a transport maneuver. The part adapter 14 or "tower barrel" is constructed to have the same dimensions as the uppermost region of the tower of that wind turbine, so that the tower head interface or yaw ring of that nacelle unit will fit onto or into the part adapter 14.

FIGS. 2A and 2B show a first arrangement of the inventive transport assembly 1, using the short load-positioning beam 131, frame 10 and adapter 14 of FIG. 1. In this setup, a relatively small nacelle is to be transported, i.e. the weight and dimensions of the nacelle allow it to be borne on a single load platform of a transport vehicle. On the left-hand side of the diagram, two short load-positioning beams 131 are shown in place on the frame 10. Each load-positioning beam 131 spans the frame 10 and is held in place by holding element or holders 16. In this embodiment, the holding element or holders 16 are steel plates shaped in the manner of a claw, with a cut-out 160 that matches the shape of the load-positioning beam 131, so that the load-positioning beam 131 will rest on the load platform and the upper surface of the lateral beams. Inner holding plates 16' have a simpler shape, as shown in FIG. 1, and serve to provide additional stability to the overall arrangement. FIG. 1 also indicates through-holes 164 in the holding plates 16 and matching through-holes 134 in fins 133 of the load-positioning beams 131. Returning to FIGS. 2A and 2B, the load-positioning beam 131 is secured to the frame 10 by inserting fasteners F through the aligned through-holes 134, 164 of the holding plates 16 and fins 133.

The frame 10 and load-positioning beams 131 are now ready to receive the part adapter 14, which can be lowered into place as shown. To this end, a suitable hoisting or lifting apparatus can be used. The diagram shows a row of downward-pointing bars 143 mounted to the part adapter 14. Each bar 143 has a number of through-holes 144, so that the part adapter 14 can be secured to a load-positioning beam 131 by inserting fasteners F through the aligned through-holes 134, 144 of the bars 143 and load-positioning beam fins 133, as shown on the right-hand side of the diagram.

FIG. 3 shows the inventive transport assembly 1 of FIG. 2A and FIG. 2B in use during the transport of a nacelle unit 2. The frame 10 has been placed in a predetermined position on the load platform 3 of a transport vehicle (not shown). The frame position can have been determined by consideration of the combined weight of the nacelle unit 2 and all the parts already installed in or on the nacelle unit 2, as indicated in the diagram. The position of the frame 10 is determined in advance to ensure that the center of gravity of the nacelle unit 2 will be centrally positioned over the load platform 3. The tower head interface 20 of the nacelle unit 2 engages with the part adapter 14. The entire assembly can now be safely transported over any distance, and the balanced load distribution ensures that stress damage to the nacelle unit 2 and the transport equipment 1, 3 is avoided.

Figure 4:
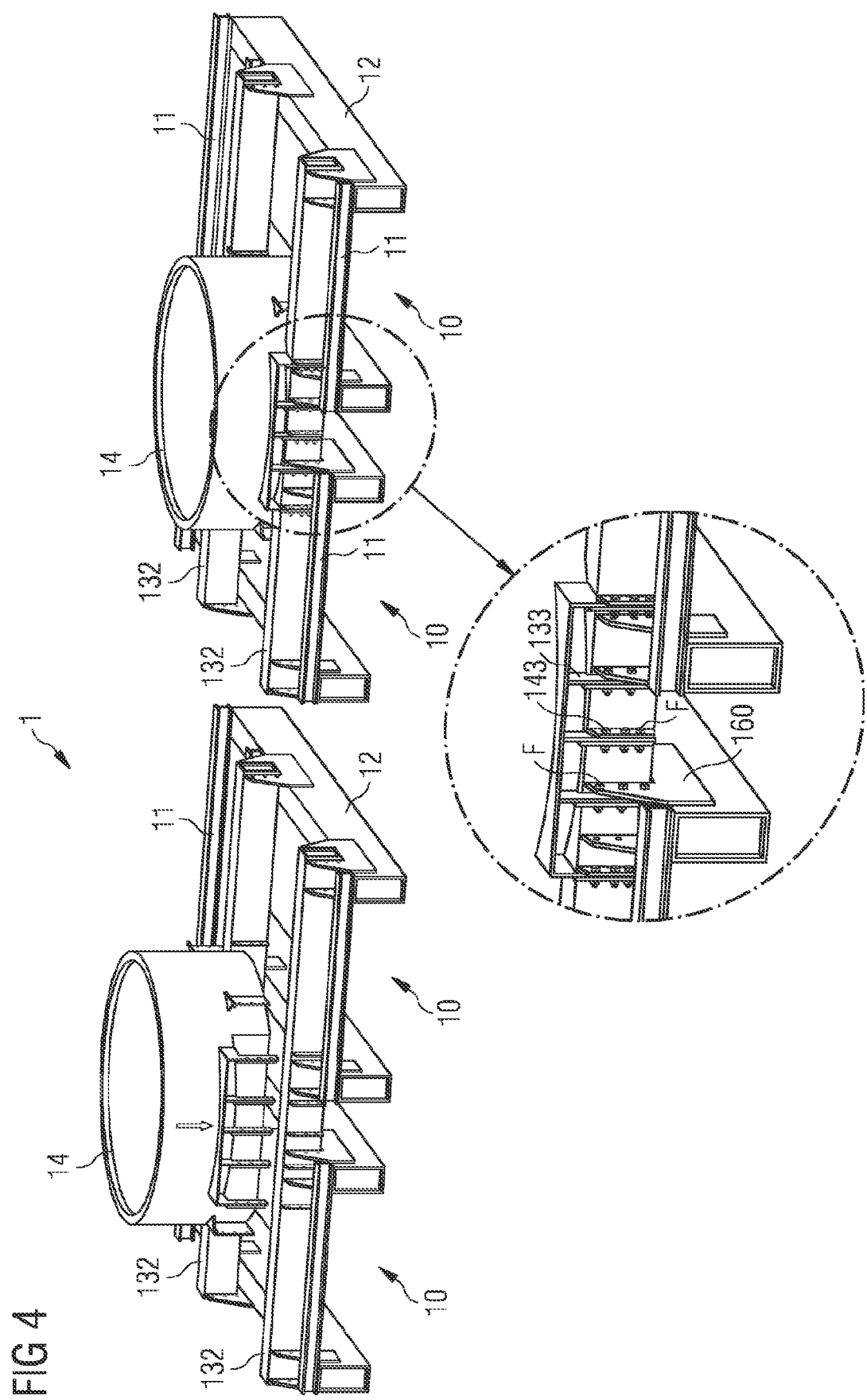
FIG. 4 shows a first embodiment of the inventive transport assembly.

FIG. 4 shows a second arrangement of the inventive transport assembly 1, using the long load-positioning beam 132, frame unit 10 and adapter 14 of FIG. 1. In this setup, a relatively large nacelle unit is to be transported, i.e. the weight and dimensions of the nacelle require the use of two load platforms. On the left-hand side of the diagram, two long load-positioning beams 132 are shown in place, spanning two frames units 10. Each load-positioning beam 132 spans the two frames units 10 and is held in place by holding plates 16 and fasteners F as described above.

The frames units 10 and load-positioning beams 132 are now ready to receive the part adapter 14 of a large nacelle unit, which can be lowered into place as shown. As described above, the part adapter 14 is secured to the load-positioning beams 132 by inserting fasteners F through aligned through-holes 134, 144 of the bars 143 and load-positioning beam fins 133 as shown in the enlarged detail view on the right-hand side of the diagram.

Figure 5:
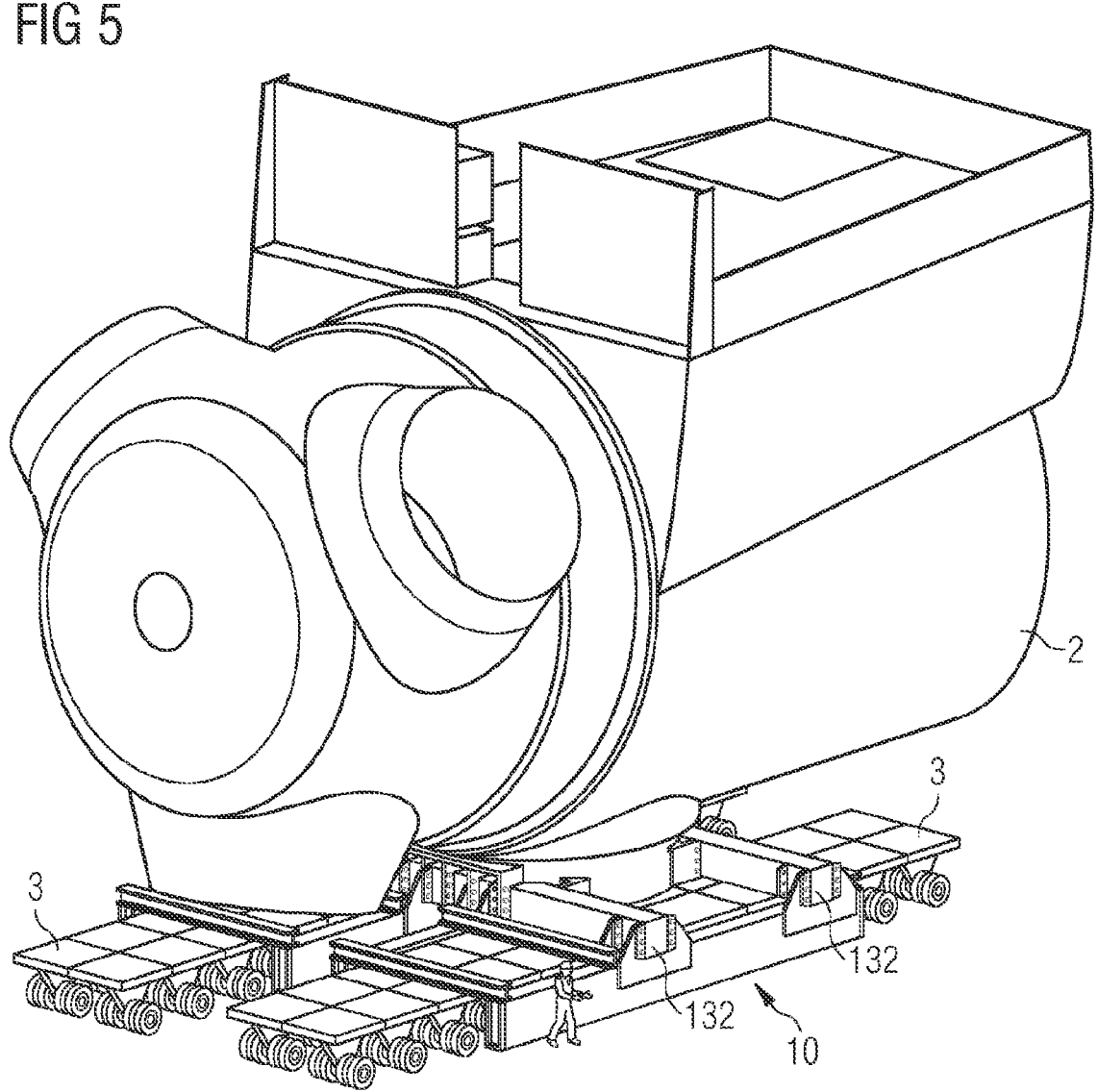
FIG. 5 shows the transport assembly of FIG. 4 in use during the transport of a load.

FIG. 5 shows the inventive transport assembly 1 of FIG. 4 in use during the transport of a large nacelle unit 2. In this case, the nacelle unit 2 also comprises an entire nacelle with hub and spinner in place at the front of the nacelle, and a cooling arrangement and landing platform in place on top of the nacelle. The combined weight of such a nacelle unit 2 can lie in the region of 300-800 metric tons or even more. The frame units 10 have been placed in predetermined positions on adjacent load platforms 3 of a transport vehicle (not shown). The load platforms 3 in this case will be jointly pulled by a single transport vehicle. The load platforms 3 are effectively held in position by the arrangement of frame units 10 and load-positioning beams 132 of the inventive transport assembly 1. As described above, the frame positions can have been determined by consideration of the combined weight of the nacelle unit 2, to ensure that the center of gravity of the nacelle unit 2 will be centrally positioned over the load-carrying area defined by the adjacent load platforms 3 and the load-positioning beams 132. The tower head interface of the nacelle unit 2 is secured to the part adapter 14. In this case also, the entire assembly can now be safely transported over any distance, and the balanced load distribution ensures that stress damage to the nacelle unit 2 and the transport equipment 1, 3 is avoided.

Figure 6:
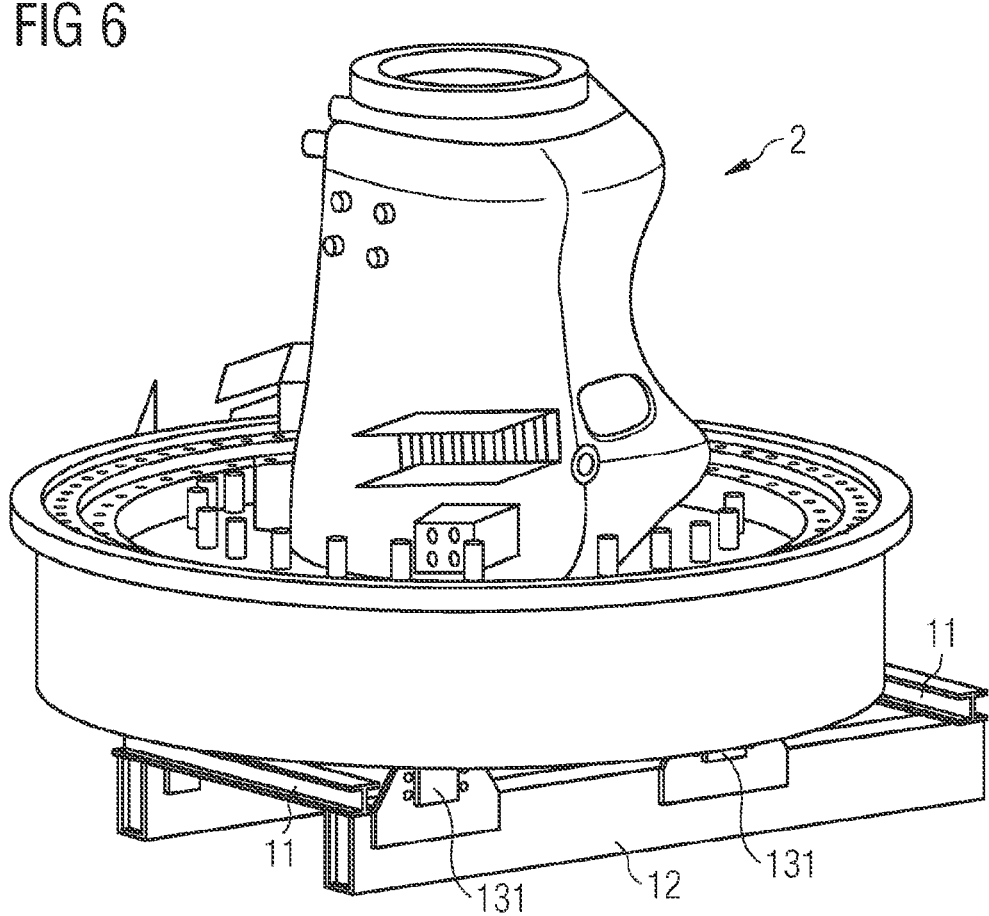
FIG. 6 shows the transport assembly of FIGS. 2A and 2B in use during the transport of a load.

FIG. 6 shows the inventive transport assembly 1 of FIGS. 2A and 2B in use during the transport of load 2, in this case a tower head unit. The diagram shows the tower head unit in place over a part adapter 14. The tower head unit can safely be transported from one location to another during the manufacture of a nacelle unit, for example.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A transport assembly for securing a load to a load platform of a transport vehicle during a transport maneuver, comprising:
   at least one frame unit configured to lie on the load platform of the transport vehicle, wherein the at least one frame unit comprises at least one transverse beam arranged to extend across a width of the load platform and held in place by a pair of lateral beams arranged to extend lengthways along sides of the load platform, wherein the at least one transverse beam is arranged to rest on an upper surface of the load platform, and wherein the at least one frame unit further comprises at least one upright holding plate arranged on at least one of the pair of lateral beams;
   at least one load-positioning beam, wherein the at least one load-positioning beam is selected from:
   a) a first load-positioning beam, wherein the first load-positioning beam is configured to span a width of a single frame unit of the at least one frame unit; and
   b) a second load-positioning beam, wherein the second load-positioning beam is configured to span a width of a pair of adjacent frame units of the at least one frame unit; and
   a part adapter configured to engage with the at least one load-positioning beam and to engage with the load.

2. The transport assembly according to claim 1, wherein the at least one upright holding plate includes a first upright holding plate on an inner side of the at least one of the pair of lateral beams and a second upright holding plate on an outer side of the at least one of the pair of lateral beams.

3. The transport assembly according to claim 1, wherein the first load-positioning beam is configured to engage with the part adapter when the part adapter is positioned centrally over the at least one frame unit, and wherein the second load-positioning beam is configured to engage with the part adapter when the part adapter is positioned centrally over the pair of adjacent frame units of the at least one frame unit.

4. The transport assembly according to claim 1, comprising an arrangement of bars mounted to the part adapter and a complementary arrangement of fins mounted to the at least one load-positioning beam, wherein the bars and fins comprise matching through-holes for receiving fasteners to form a connection between the part adapter and the at least one load-positioning beam.

5. The transport assembly according to claim 1, wherein the at least one upright holding plate is arranged to hold the at least one load-positioning beam in place on the at least one frame unit.

6. The transport assembly according to claim 5, wherein the at least one upright holding plate is arranged to extend upward from the at least one of the pair of lateral beams of the at least one frame unit to engage from below with the at least one load-positioning beam.

7. The transport assembly according to claim 1, wherein at least one bar is mounted to the part adapter and is arranged to extend downward from the part adapter.

8. The transport assembly according to claim 5, wherein the at least one upright holding plate comprises a rectangular cut-out to fit about the at least one load-positioning beam.

9. The transport assembly according to claim 8, comprising a matching arrangement of through-holes in the plate and in a complementary arrangement of fins mounted to the at least one load-positioning beam, for receiving fasteners to secure the at least one load-positioning beam to the at least one frame unit.

10. The transport assembly according to claim 1, configured to transport a wind turbine nacelle unit with a weight of at least 200 metric tons.

11. The transport assembly according to claim 1, wherein the part adapter is configured to connect to a wind turbine tower head interface with a diameter of at least 4 m.

12. A method of securing a load on a load platform of a transport vehicle during a transport maneuver, comprising:
   providing at least one frame unit configured to lie on the load platform of the transport vehicle, wherein the at least one frame unit comprises at least one transverse beam arranged to extend across a width of the load platform and held in place by a pair of lateral beams arranged to extend lengthways along sides of the load platform, wherein the at least one transverse beam is arranged to rest on an upper surface of the load platform, and wherein the at least one frame unit further comprises at least one upright holding plate arranged on at least one of the pair of lateral beams;
   providing at least one load-positioning beam, wherein the at least one load-positioning beam is selected from
   a) a first load-positioning beam, wherein the first load-positioning beam is configured to span a width of a single frame unit of the at least one frame unit, and
   b) a second load-positioning beam, wherein the second load-positioning beam is configured to span a width of a pair of adjacent frame units of the at least one frame unit;
   arranging either
   a) the single frame unit over the load platform and arranging the first load-positioning beam across the single frame unit, or
   b) the pair of adjacent frame units over the load platform and arranging the second load-positioning beam across the pair of adjacent frame units; and subsequently
   engaging a part adapter with the at least one load-positioning beam; and
   engaging the load with the part adapter.

13. The method according to claim 12, wherein the at least one upright holding plate includes a first upright holding plate on an inner side of the at least one of the pair of lateral beams and a second upright holding plate on an outer side of the at least one of the pair of lateral beams.

* * * * *